US010754221B2

United States Patent
Yamada (10) Patent No.: US 10,754,221 B2
(45) Date of Patent: Aug. 25, 2020

(54) POLARIZATION MULTIPLEXER/DEMULTIPLEXER WITH REDUCED POLARIZATION ROTATION

(71) Applicant: Lumentum Operations LLC, Milpitas, CA (US)

(72) Inventor: Hiroaki Yamada, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 44 days.

(21) Appl. No.: 16/116,277

(22) Filed: Aug. 29, 2018

(65) Prior Publication Data
US 2019/0227402 A1    Jul. 25, 2019

Related U.S. Application Data

(60) Provisional application No. 62/621,408, filed on Jan. 24, 2018.

(51) Int. Cl.
  *G02B 6/12* (2006.01)
  *G02F 1/225* (2006.01)
  *G02F 1/21* (2006.01)

(52) U.S. Cl.
  CPC .............. *G02F 1/225* (2013.01); *G02B 6/12* (2013.01); *G02F 2001/212* (2013.01); *G02F 2203/07* (2013.01); *G02F 2203/20* (2013.01)

(58) Field of Classification Search
  CPC ......... G02F 2201/063; G02F 2201/066; G02B 2006/12097; G02B 2006/121
  See application file for complete search history.

(56) References Cited

U.S. PATENT DOCUMENTS

| | | | | |
|---|---|---|---|---|
| 4,781,424 A | * | 11/1988 | Kawachi | G02B 6/126 385/1 |
| 7,389,033 B2 | * | 6/2008 | Hashizume | G02F 1/225 385/11 |
| 2002/0126933 A1 | * | 9/2002 | Goh | G02B 6/12007 385/2 |

(Continued)

OTHER PUBLICATIONS

Wildermuth et al., "Penalty-free polarisation compensation of SiO2/Si arrayed waveguide grating wavelength multiplexers using stress release grooves", Electronics Letters Aug. 20, 1998 vol. 34 No. 17 (Year: 1998).*

(Continued)

*Primary Examiner* — Charlie Y Peng
(74) *Attorney, Agent, or Firm* — Harrity & Harrity, LLP (57) ABSTRACT

An optical device may include a waveguide-based Mach-Zehnder (MZ) interferometer associated with performing polarization multiplexing or demultiplexing. The waveguide-based MZ interferometer may include a first MZ arm, a second MZ arm, and a set of stress-balancing trenches. A portion of the first MZ arm may be between at least two stress-reducing trenches of a plurality of stress-reducing trenches. The plurality of stress-reducing trenches may be in a cladding layer on a substrate. The set of stress-balancing trenches may be on an opposite side of the second MZ arm from the plurality of stress-reducing trenches. The set of stress-balancing trenches may be in the cladding layer on the substrate.

20 Claims, 5 Drawing Sheets

(56) References Cited

U.S. PATENT DOCUMENTS

| | | | |
|---|---|---|---|
| 2003/0072548 A1* | 4/2003 | Bhardwaj | G02B 6/13 385/129 |
| 2004/0096141 A1 | 5/2004 | Singh et al. | |
| 2004/0264839 A1* | 12/2004 | Suzuki | G02B 26/105 385/14 |
| 2005/0089263 A1* | 4/2005 | Wessel et al. | G02F 1/01 |
| 2005/0135728 A1* | 6/2005 | Sala et al. | G02B 6/12 |
| 2006/0115196 A1* | 6/2006 | Feke | G02F 1/225 385/2 |
| 2010/0080507 A1* | 4/2010 | Shiraishi | G02F 1/0356 385/14 |
| 2015/0370095 A1* | 12/2015 | Kondou et al. | G02F 1/035 |

OTHER PUBLICATIONS

T. Mizuno et al., "Integrated In-Band OSNR Monitor Based on Planar Lightwave Circuit", ECOC 2009, Sep. 20-24, 2009, Vienna, Austria, NTT Photonics Laboratories, NTT Corporation, 2 pages.

* cited by examiner

POLARIZATION MULTIPLEXER/DEMULTIPLEXER WITH REDUCED POLARIZATION ROTATION

RELATED APPLICATION

This application claims priority under 35 U.S.C. § 119 to U.S. Provisional Patent Application No. 62/621,408, filed on Jan. 24, 2018, the content of which is incorporated by reference herein in its entirety.

TECHNICAL FIELD

The present disclosure relates to a polarization multiplexer/demultiplexer and, more particularly, to a polarization multiplexer/demultiplexer with a set of stress-reducing trenches that reduces polarization rotation.

BACKGROUND

Polarization multiplexing/demultiplexing is an important function in a high-speed coherent optical transmission system. One technique used to perform polarization multiplexing/demultiplexing on an optical waveguide is to use a Mach-Zehnder (MZ) interferometer based polarization multiplexer/demultiplexer. In order to provide polarization multiplexing/demultiplexing, the MZ interferometer is designed to create a $\pi$ phase difference between two orthogonal polarization states of light as the light propagates through optical waveguides of the arms of the MZ interferometer. The $\pi$ phase difference is introduced by trenches formed near an optical waveguide of one arm of the MZ interferometer. The trenches serve to reduce compressive stress on the optical waveguide. This change in compressive stress affects a waveguide propagation constant for the two orthogonal polarizations differently. Here, by knowing the difference of the waveguide propagation constant between the two orthogonal polarizations, a trench length can be selected that produces $\pi$ phase birefringence such that a $\pi$ phase difference is introduced to the two orthogonal polarizations when passing through the optical waveguides of the MZ interferometer.

SUMMARY

According to some possible implementations, an optical device may include: a waveguide-based Mach-Zehnder (MZ) interferometer to perform polarization multiplexing or demultiplexing, the waveguide-based MZ interferometer including: a first MZ arm, wherein a portion of the first MZ arm is between at least two stress-reducing trenches of a plurality of stress-reducing trenches, wherein the plurality of stress-reducing trenches is in a cladding layer on a substrate; a second MZ arm; and a set of stress-balancing trenches, wherein the set of stress-balancing trenches is on an opposite side of the second MZ arm from the plurality of stress-reducing trenches, and wherein the set of stress-balancing trenches is in the cladding layer on the substrate.

According to some possible implementations, an optical device may include: a Mach-Zehnder (MZ) interferometer including: a first MZ arm, wherein a portion of the first MZ arm is between a pair of trenches, wherein the pair of trenches is in a cladding layer on a substrate; a second MZ arm, wherein a first trench, of the pair of trenches, is between the second MZ arm and the first MZ arm; and a polarization axis maintenance structure that causes stress on a portion of the second MZ arm to be substantially symmetric such that an orientation of a polarization axis is substantially maintained in the second MZ arm, wherein the polarization axis maintenance structure is in the cladding layer on the substrate.

According to some possible implementations, a waveguide-based Mach-Zehnder (MZ) interferometer may include: a first arm to guide light propagating in the first arm of the waveguide-based MZ interferometer; at least two stress-reducing trenches to reduce stress on a portion of the first arm such that $\pi$ phase birefringence is induced between two orthogonal polarization states of the light propagating in the waveguide-based MZ interferometer, wherein the portion of the first arm is between a pair of the at least two stress-reducing trenches, and wherein the at least two stress-reducing trenches are on or in a substrate of the waveguide-based MZ interferometer; a second arm to guide light propagating in the second arm of the waveguide-based MZ interferometer; and a set of stress-balancing trenches to maintain an orientation of a polarization axis in a portion of the second arm, wherein the set of stress-balancing trenches is on an opposite side of the second arm from the at least two stress-reducing trenches, and wherein the set of stress-balancing trenches is on or in the substrate of the waveguide-based MZ interferometer.

DETAILED DESCRIPTION

The following detailed description of example implementations refers to the accompanying drawings. The same reference numbers in different drawings may identify the same or similar elements.

As described above, a MZ interferometer based polarization multiplexer/demultiplexer can include a MZ arm proximal to (e.g., around or near) which a set of stress-reducing trenches is formed in order to induce a $\pi$ phase difference between orthogonal polarizations of light as light propagates through the MZ interferometer. The trenches proximal to the optical waveguide of the trenched arm may be referred to as stress-reducing trenches since the trenches are designed to reduce compressive stress on the optical waveguide of the trenched arm in association with inducing $\pi$ phase birefringence.

Figure 1A:
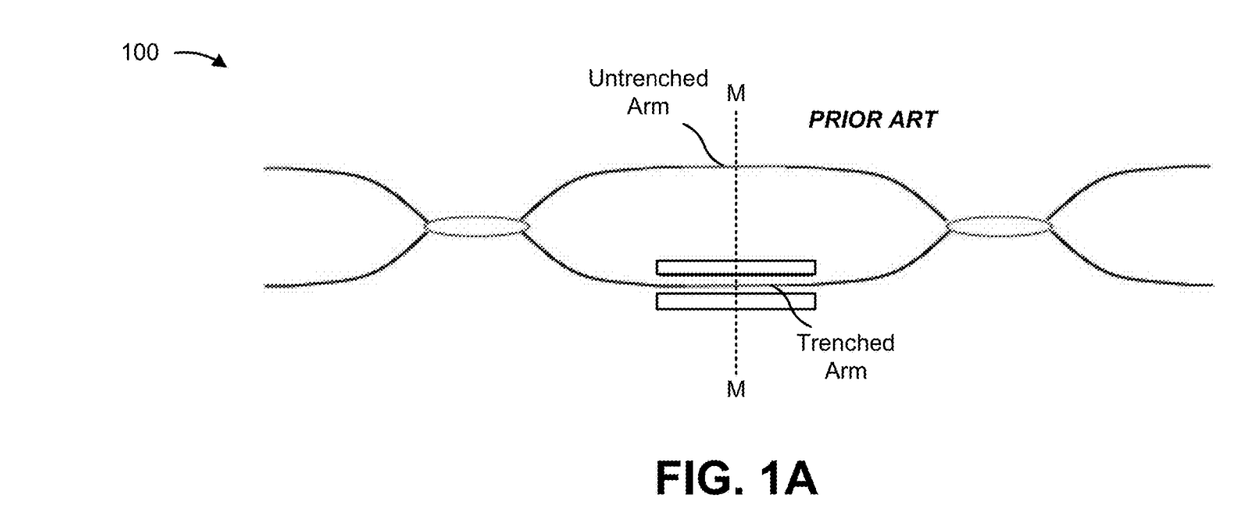
FIGS. 1A-1C are diagrams associated with a prior art polarization multiplexer/demultiplexer.
Figure 1B:
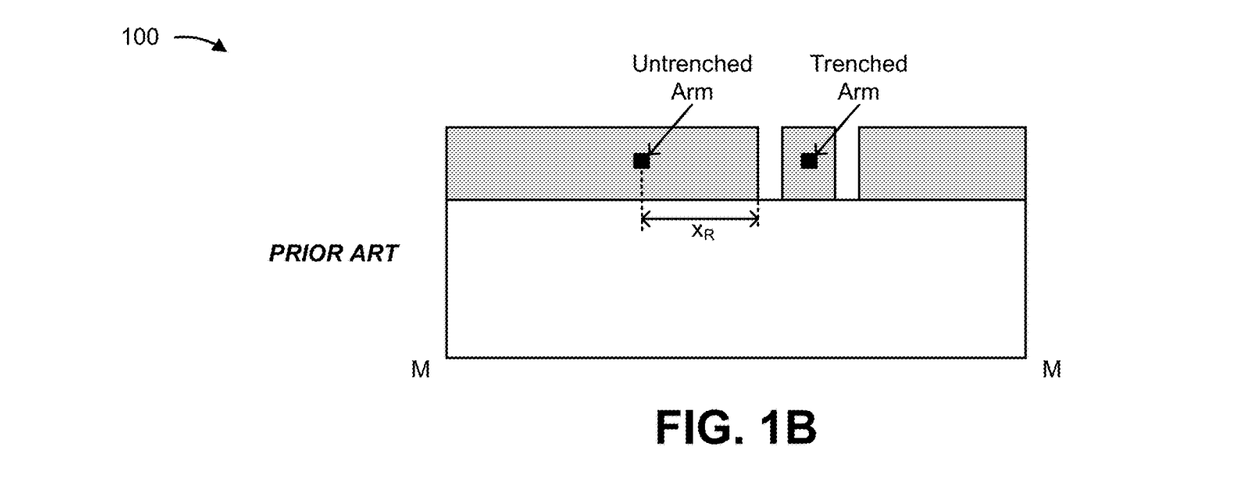

FIG. 1A is a diagram of a prior art MZ interferometer based polarization multiplexer/demultiplexer 100 (herein referred to as prior art MZ interferometer 100) that includes a set of stress-reducing trenches designed to create a $\pi$ phase difference between two orthogonal polarization states of light. FIG. 1B shows a cross section of prior art MZ interferometer 100 at line M-M shown in FIG. 1A. As shown in FIGS. 1A and 1B, a trench is formed on each side of an optical waveguide of one arm of the MZ interferometer (herein referred to as a trenched arm). The arm of the MZ interferometer distal to (e.g., further from) the set of stress-reducing trenches may be referred to as the untrenched arm.

Generally, a distance between the trenched arm and the untrenched arm should be selected in order to reduce an overall device length as much as possible. However, due to the presence of the set of stress-reducing trenches, the change in birefringence of the untrenched arm increases as the distance between the trenched arm and the untrenched arm decreases. Here, in order to reduce the change in birefringence of the untrenched arm resulting from the set of stress-reducing trenches, a distance between the trenched arm and the untrenched arm needs to be increased. However, since the length of the device is dependent on the separation between the arms (as the separation between the arms increases, longer bends are needed in order to reduce loss), this increase in arm separation necessitates an increase in device length.

Another problem with prior art MZ interferometer 100 is asymmetric stress to the optical waveguide of the untrenched arm resulting from the set of stress-reducing trenches. For example, even when the distance between the trenched arm and the untrenched arm is sufficient such that that the change in birefringence of the untrenched arm is ignorable, there is still stress asymmetry at the untrenched arm (e.g., asymmetrical compressive stress is present on the optical waveguide of the untrenched arm). This stress asymmetry produces a tilted polarization axis, which results in polarization rotation after light passes through the untrenched arm. Thus, when an application requires an orientation of a polarization axis to be maintained, the distance between the trenched arm and the untrenched arm has to be further increased in order to reduce the polarization rotation, which necessitates a further increase in device length, as described above.

Figure 1C:
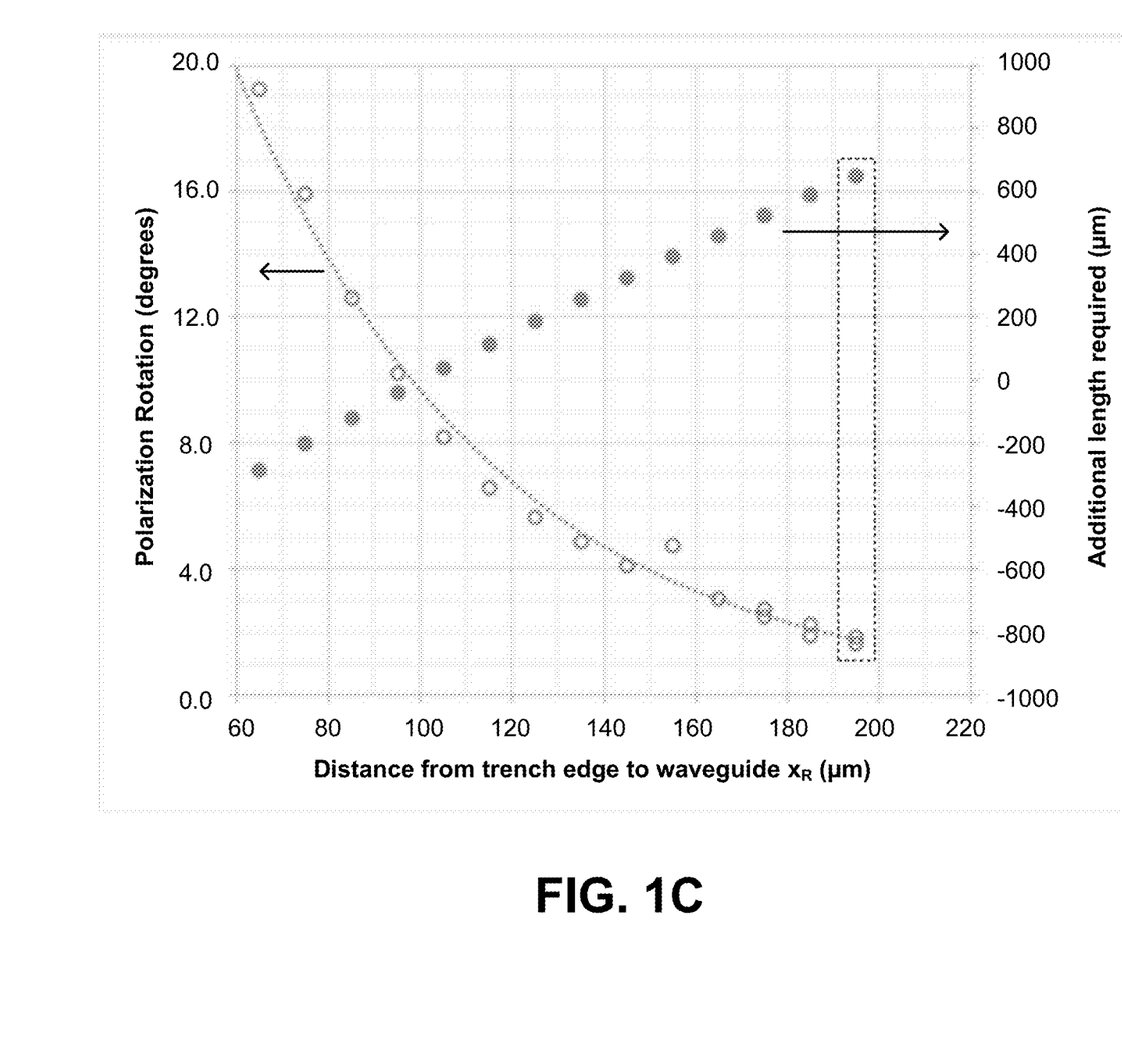

FIG. 1C shows an example experimental result of polarization rotation in a prior art MZ interferometer (e.g., prior art MZ interferometer 100) as a function of a distance $x_R$ between the optical waveguide of an untrenched arm and an edge of a nearest trench. FIG. 1C also illustrates a required additional device length, using a device with a 100 micron (μm) length as a reference. Further, FIG. 1C assumes a constant arc S-bend with 5 millimeter (mm) bend radius to construct the MZ arms. As shown in FIG. 1C, distance $x_R$ needs to be approximately 195 μm in order to achieve an approximately 1.8 degree polarization rotation (i.e., a polarization maintenance of 30 dB) in the untrenched arm. However, as illustrated, in order to achieve this distance $x_R$, the length of the device needs to be increased by approximately 600 μm. Thus, as this example shows, a significantly longer device is required in order to achieve an acceptable amount of polarization rotation in prior art MZ interferometer 100.

Some implementations described herein provide an improved polarization multiplexer/demultiplexer that includes a set of stress-balancing trenches proximal to an optical waveguide of an untrenched MZ arm. In some implementations, the set of stress-balancing trenches causes stress (e.g., compressive stress) at or near the optical waveguide of the untrenched arm to be substantially symmetric such that an orientation of a polarization axis, associated with the untrenched arm, is substantially maintained. In other words, the set of stress-balancing trenches causes stress asymmetry at or near the optical waveguide of the untrenched arm to be reduced or eliminated such that polarization axis rotation in the untrenched arm is reduced or eliminated. Thus, the polarization axis can be substantially maintained without a significant increase in a required device length.

FIGS. 2A-2E are diagrams associated with polarization multiplexers/demultiplexers that include a set of stress-balancing trenches associated with reducing or eliminating polarization axis rotation, as described herein.

Figure 2A:
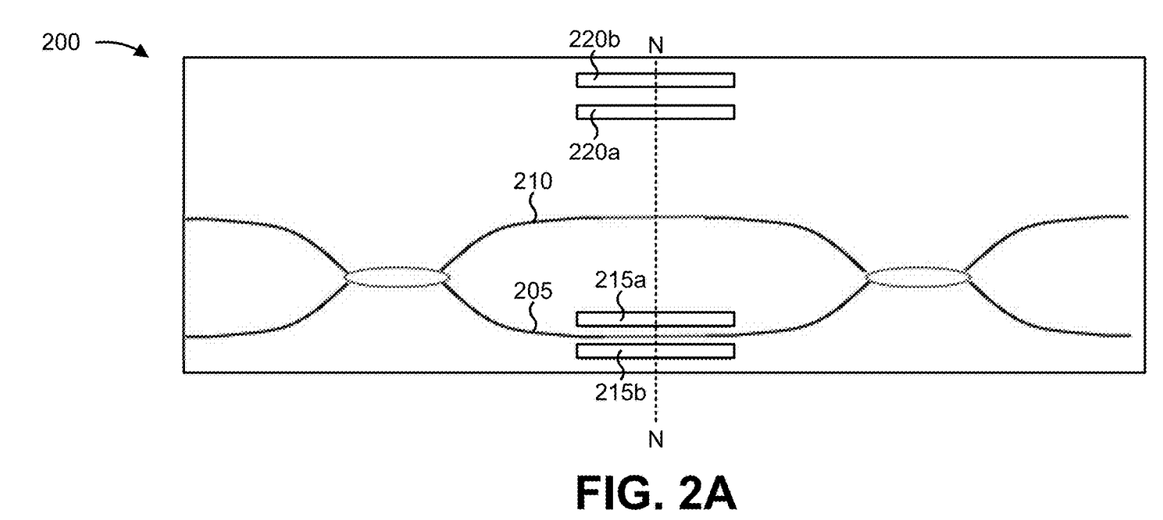
FIGS. 2A-2E are diagrams associated with polarization multiplexers/demultiplexers that include a set of stress-balancing trenches associated with reducing or eliminating polarization axis rotation, as described herein.
Figure 2B:
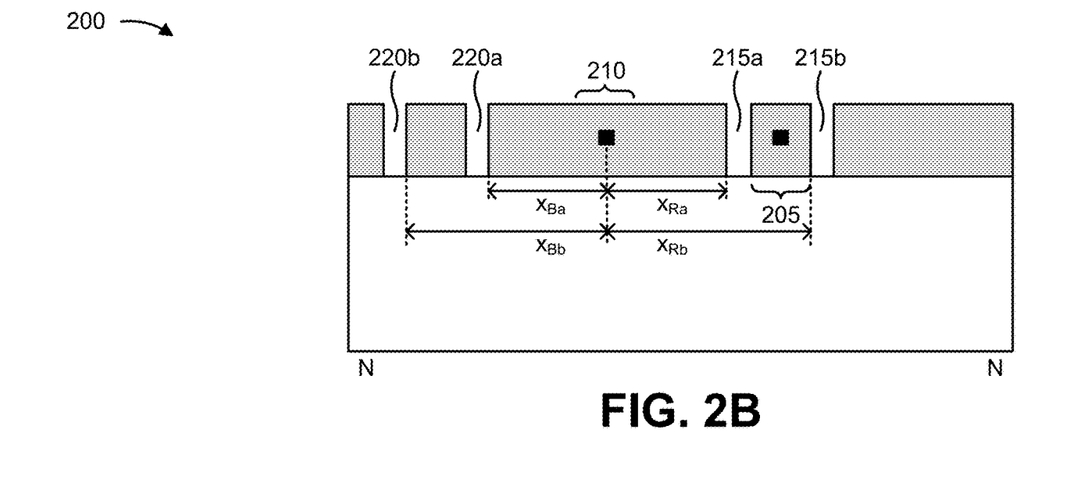

FIGS. 2A and 2B are diagrams of a MZ interferometer based polarization multiplexer/demultiplexer 200 (herein referred to as MZ interferometer 200) that includes a set of stress-balancing trenches associated with reducing or eliminating polarization axis rotation. FIG. 2A is a diagram of an example top view of MZ interferometer 200, and FIG. 2B is an example of a cross section of MZ interferometer 200 at line N-N, as identified in FIG. 2A.

As shown in FIG. 2A, MZ interferometer 200 includes a trenched arm 205 and an untrenched arm 210. Trenched arm 205 is referred to as such since a set of stress-reducing trenches 215 (e.g., stress-reducing trench 215a and stress-reducing trench 215b) is formed proximal to (e.g., around, near, and/or the like) an optical waveguide of trenched arm 205, as described above. As indicated in FIG. 2B, the optical waveguide of trenched arm 205 may include a waveguide core (e.g., identified using a black square shape in FIG. 2B) corresponding to trenched arm 205 and a portion of a cladding (e.g., identified as a gray layer in FIG. 2B) surrounding the waveguide core corresponding to trenched arm 205.

As described above, the set of stress-reducing trenches 215 may be designed to introduce a π phase difference between two orthogonal polarizations of light as the light passes through MZ interferometer 200 (in association with providing polarization multiplexing or demultiplexing functionality). In some implementations, a portion of trenched arm 205 may be between at least two stress-reducing trenches 215. For example, in MZ interferometer 200, a portion of trenched arm 205 may be between stress-reducing trench 215a and stress-reducing trench 215b. Notably, while MZ interferometer 200 is shown as including a pair of stress-reducing trenches 215 with matching dimensions (e.g., having the same lengths, widths, and depths, within a threshold tolerance of, for example, 1 nm, 5 nm, and/or the like), and relative distances to the waveguide core of trenched arm 205, other implementations are possible. For example, in some implementations, MZ interferometer 200 may include a different number of stress-reducing trenches 215, stress-reducing trenches 215 with different dimensions and/or relative dimensions, stress-reducing trenches 215 with different relative distances to the waveguide core of trenched arm 205, and/or the like.

Untrenched arm 210 is referred to as such since the set of stress-reducing trenches 215 is formed distal to (e.g., further from) the optical waveguide of trenched arm 205 (e.g., as compared trenched arm 205). As indicated in FIG. 2B, an optical waveguide of untrenched arm 210 may include a waveguide core corresponding to untrenched arm 210 and a portion of the cladding surrounding the waveguide core corresponding to untrenched arm 210.

In some implementations, a waveguide core of MZ interferometer 200 may be formed from an inorganic material, such as doped $SiO_2$ glass, un-doped $SiO_2$ glass, silicon oxynitride, silicon nitride, silicon, and/or the like. In some implementations, the waveguide core of MZ interferometer 200 may be formed from an organic material, such as a polymer. In some implementations, the cladding layer may be formed from an inorganic material, such as doped $SiO_2$ glass, un-doped $SiO_2$ glass, silicon oxynitride, silicon nitride, and/or the like. In some implementations, the cladding layer may be formed from an organic material, such as a polymer. In some implementations, the cladding layer may be air. In some implementations, as indicated in FIG. 2B, MZ interferometer 200 may be formed on a substrate layer, which may be, for example, a silicon substrate. In general, the techniques described herein may be applied to any optical device including an optical waveguide that has a thermal stress due to a coefficient of temperature expansion (C 1E) mismatch in a waveguide core/cladding/substrate, and there is temperature difference between that at waveguide layer fabrication and device operation.

In still other implementations, the MZ interferometer may be formed in or on another substrate material, such as a semiconductor material (e.g., Indium Phosphide, Gallium Arsenide, and/or the like) or another dielectric material (e.g., Lithium Niobate, and/or the like).

As further shown, MZ interferometer 200 includes a set of stress-balancing trenches 220 (e.g., stress-balancing trench 220a and stress-balancing trench 220b are shown). The set of stress-balancing trenches 220 is a set of trenches (e.g., one or more trenches) arranged to cause stress (e.g., compressive stress) at or near the optical waveguide of untrenched arm 210 to be substantially symmetric such that an orientation of a polarization axis, associated with untrenched arm 210, is substantially maintained. For example, the set of stress-balancing trenches 220 may be arranged to balance stress asymmetry on the optical waveguide of untrenched arm 210 that would otherwise be result from the presence of the set of stress-reducing trenches 215. In other words, the set of stress-balancing trenches 220 cause stress asymmetry at or near the optical waveguide of untrenched arm 210 to be reduced or eliminated such that polarization axis rotation in untrenched arm 210 is reduced or eliminated. In this way, the set of stress-balancing trenches 220 allows a polarization axis to be substantially maintained without a significant increase in a required length of MZ interferometer 200 (e.g., as compared to prior art MZ interferometer 100). Notably, while the set of stress-balancing trenches 220 may create stress asymmetry at trenched arm 205, this effect is negligible due to the relatively large distance between the set of stress-balancing trenches 220 and trenched arm 205.

Figure 2C:
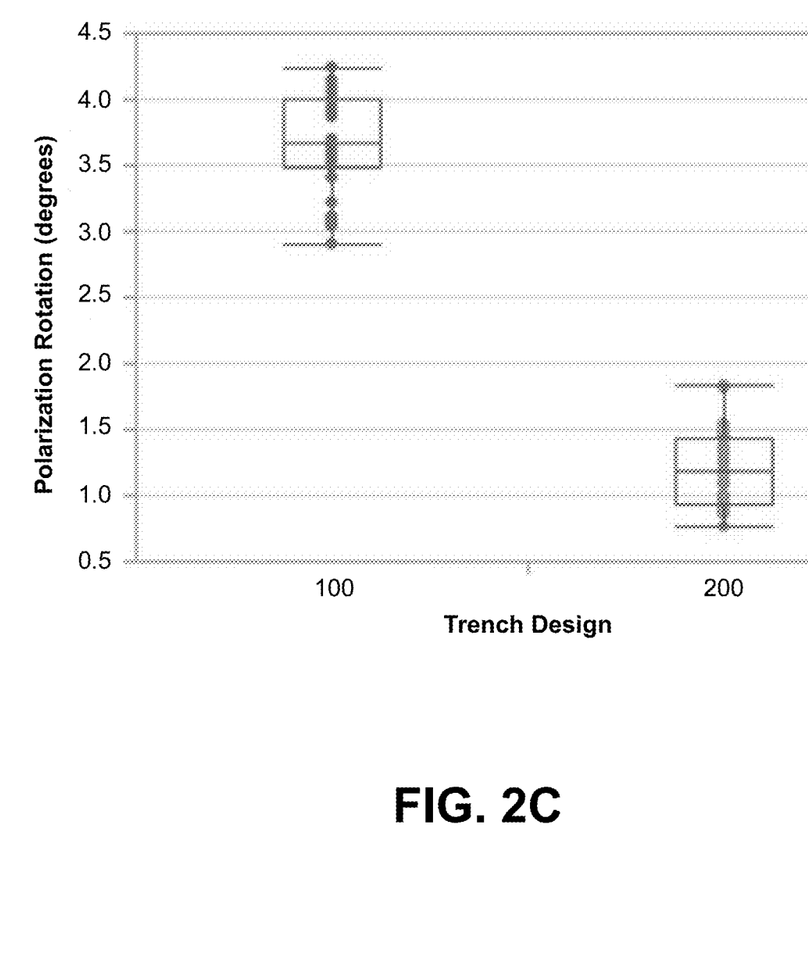

FIG. 2C is a diagram illustrating example experimental results of polarization rotation achieved using an example prior art MZ interferometer and MZ interferometer 200 including a set of stress-balancing trenches 220. In the example associated with FIG. 2C, a 115 µm distance from an edge of a nearest stress-reducing trench to a waveguide core of untrenched arm 210 was assumed. As is clear from FIG. 2C, polarization axis rotation is significantly improved in MZ interferometer 200 as compared to prior art MZ interferometer 100.

The example experiment also shows that a birefringence difference between trenched arm 205 and untrenched arm 210 was reduced by approximately 10% in MZ interferometer 200 (e.g., since the set of stress-reducing trenches 215 slightly increase birefringence near untrenched arm 210). As a result, in this example, MZ interferometer 200 needs to be approximately 200 µm longer than when using a conventional design. However, this increase is significantly smaller than that required when using the conventional approach of providing increased arm separation in order to reduce polarization rotation.

Returning to FIGS. 2A and 2B, in some implementations, the set of stress-balancing trenches 220 is on an opposite side of untrenched arm 210 from the set of stress-reducing trenches 215. For example, as shown in FIG. 2B, the set of stress-balancing trenches 220 is on a left side of untrenched arm 210, while the set of stress-reducing trenches 215 is on a right side of untrenched arm 210. In some implementations, a distance between (e.g., an edge of) a given stress-balancing trench 220 untrenched arm 210 may be in a range from approximately 30 µm to approximately 250 µm, such as 115 µm.

In some implementations, a number of trenches included in the set of stress-balancing trenches 220 matches a number of trenches included in the set of stress-reducing trenches 215. For example, as shown with respect to MZ interferometer 200, the set of stress-balancing trenches 220 and the set of stress-reducing trenches 215 may include two trenches. Alternatively, the number of trenches included in the set of stress-balancing trenches 220 may differ from the number of trenches included in the set of stress-reducing trenches 215, in some implementations. For example, the set of stress-balancing trenches 220 may include a single trench, and the set of stress-reducing trenches 215 may include two trenches.

In some implementations, a shape of one or more of the set of stress-balancing trenches 220 may match (e.g., be the same, within a threshold tolerance of, for example, 1 nm, 5 nm, and/or the like) a shape of one or more of the set of stress-reducing trenches 215. For example, as shown with respect to MZ interferometer 200, the set of stress-balancing trenches 220 and the set of stress-reducing trenches 215 include rectangular shaped trenches. Alternatively, a shape of a given stress-balancing trench 220 or a given stress-reducing trench 215 may differ from that of another stress-reducing trench 215 and/or stress-balancing trench 220, in some implementations. For example, one or more stress-balancing trenches 220 and/or stress-reducing trenches 215 may have an oval shape, while one or more other stress-balancing trenches 220 and/or stress-reducing trenches 215 may have a rectangular shape.

Notably, while rectangular shaped trenches are illustrated in MZ interferometer 200, other shapes of trenches are possible. For example, in some implementations, one or more stress-reducing trenches 215 and/or one or more stress-balancing trenches 220 may have a trapezoidal shape. In such a case, a given trench (e.g., a given stress-reducing trench 215, a given stress-balancing trench 220) may have a width that gradually increases (e.g., from approximately 0 µm) to a particular width along a first portion of an associated MZ arm, remains at the design width along a second portion of the associated MZ arm, and gradually decreases from the particular width (e.g., to approximately 0 µm) along a third portion of the associated MZ arm).

As another example, in some implementations, one or more stress-reducing trenches 215 and/or one or more stress-balancing trenches 220 may have a curved shape. In such a case, a given trench may start at comparatively larger distance from an associated MZ arm and may gradually approach the associated MZ arm along a first portion of the associated MZ arm (e.g., such that the given trench is at a comparatively smaller distance from the associated MZ arm). Here, the given trench may remain at the comparatively smaller distance along a second portion of the associated MZ arm and, along a third portion of the MZ arm, may gradually move away from the associated MZ arm (e.g., such that the end of the given trench is at the comparatively larger distance from the associated MZ arm).

In some cases, a trench having a trapezoidal and/or a curved shape may act to reduce an effect of an abrupt change in a waveguide propagation constant that may be caused by another trench design, such as a straight rectangular trench. As such, in some cases, a trench having a trapezoidal and/or a curved shape may improve performance of MZ interferometer 200.

In some implementations, one or more stress-reducing trenches 215 and/or one or more stress-balancing trenches

220 may have another shape, such as an oval shape, a rounded rectangular shape, a diamond shape, and/or another shape.

In some implementations, a dimension (e.g., a length, a width, a depth) of one or more of the set of stress-balancing trenches 220 may match (e.g., be the same as, within a threshold tolerance of, for example, 1 µm, 5 µm, and/or the like) a dimension of one or more of the set of stress-reducing trenches 215. For example, as shown with respect to MZ interferometer 200, a dimension of each of the set of stress-balancing trenches 220 may match a dimension of each of the set of stress-reducing trenches 215. Alternatively, a dimension of a given stress-balancing trench 220 or a given stress-reducing trench may differ from that of another stress-reducing trench 215 and/or stress-balancing trench 220, in some implementations.

In some implementations, a length of a given trench (e.g., a given stress-balancing trench 220 or a given stress-reducing trench 215) may be in a range from approximately 0.5 mm to approximately 5 mm, such as 2 mm. In some implementations, a width of the given trench may be in a range from approximately 5 µm to approximately 200 µm, such as 40 µm. In some implementations, a depth of the given trench may be in a range from approximately 10 µm to approximately 200 µm, such as 30 µm. In some implementations, a given trench may be formed such that a bottom of the trench is at or below a top surface of the substrate layer. Alternatively, the given trench may be formed such that the bottom of the trench does not reach the substrate layer (e.g., such that a portion of the cladding remains between the bottom of the given trench and the substrate layer).

In some implementations, the set of stress-balancing trenches 220 and the set of stress-reducing trenches 215 may be arranged symmetrically (e.g., such that corresponding opposite trenches are arranged equidistant from a center of untrenched arm 210, within a threshold tolerance of, for example, 1 µm, 5 µm, and/or the like) with respect to untrenched arm 210. For example, in MZ interferometer 200, a distance $x_{Ra}$ between untrenched arm 210 (e.g., the waveguide core of untrenched arm 210) and (e.g., a nearest edge of) stress-reducing trench 215a may match (e.g., be the same as, within a threshold tolerance of a few µm) a distance $x_{Ba}$ between untrenched arm 210 and stress-balancing trench 220a. Further, a distance $x_{Rb}$ between untrenched arm 210 and stress-reducing trench 215b may match a distance $x_{Bb}$ between untrenched arm 210 and stress-balancing trench 220b. In this example, if shapes and dimensions of the set of stress-balancing trenches 220 match those of the set of stress-reducing trenches (as shown), stress asymmetry on the optical waveguide of untrenched arm 210 may be reduced, or even eliminated. In some implementations, as in MZ interferometer 200, a distance between a pair of stress-balancing trenches 220 may match a distance between a respective pair of stress-reducing trenches 215.

Alternatively, the set of stress-balancing trenches 220 and the set of stress-reducing trenches 215 may be arranged asymmetrically with respect to untrenched arm 210. For example, the distance $x_{Ra}$ may not match the distance $x_{Ba}$ and/or the distance $x_{Rb}$ may not match the distance $x_{Bb}$. Here, while stress asymmetry may not be eliminated in such cases (e.g., when the set of stress-balancing trenches 220 includes differently sized, shaped, and/or arranged trenches than those in the set of stress-reducing trenches 215), the stress asymmetry may still be reduced such that an orientation of a polarization axis is maintained to a desired level.

Figure 2D:
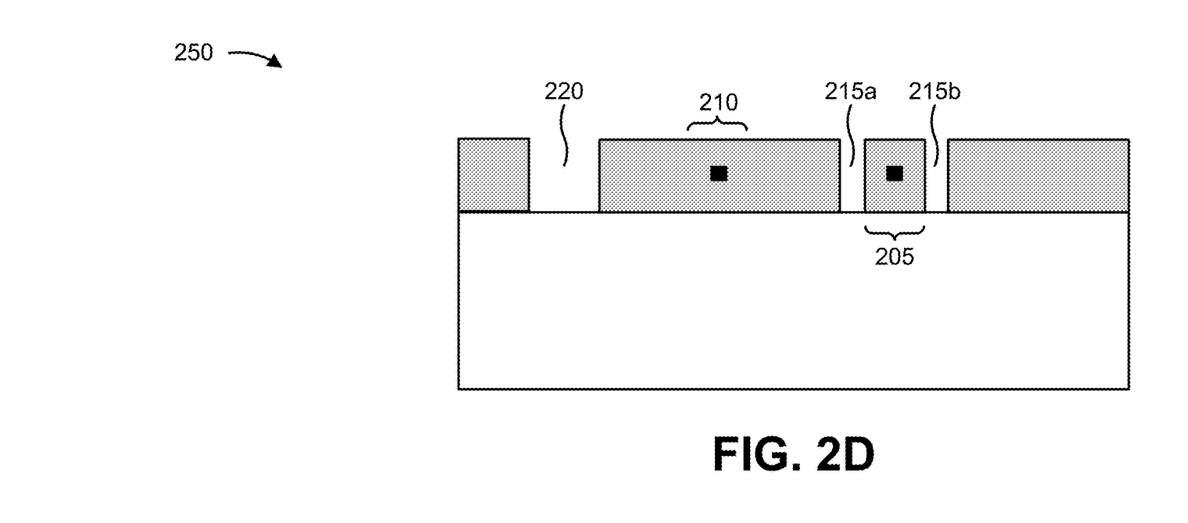

FIGS. 2D and 2E are diagrams of additional example MZ interferometer based polarization multiplexer/demultiplexers that include sets of stress-balancing trenches 220. FIG. 2D is a diagram of an example MZ interferometer based polarization multiplexer/demultiplexer 250 (herein referred to as MZ interferometer 250) that includes a single stress-balancing trench 220. Notably, in MZ interferometer 250, stress-balancing trench 220 is comparatively wider than each of the set of stress-reducing trenches 215.

Figure 2E:
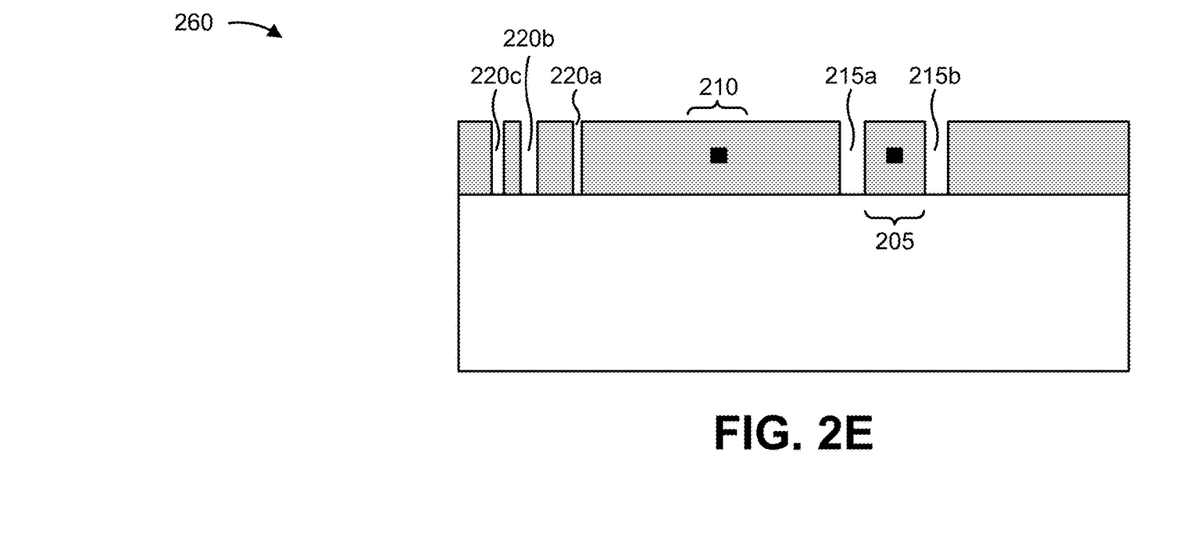

FIG. 2E is a diagram of an example MZ interferometer based polarization multiplexer/demultiplexer 250 (herein referred to as MZ interferometer 260) that includes three stress-balancing trenches 220 (e.g., stress-balancing trench 220a, stress-balancing trench 220b, and stress-balancing trench 220c). Notably, in MZ interferometer 260, each stress-balancing trench 220 is comparatively narrower than each of the set of stress-reducing trenches 215.

The number, size, and arrangement of trenches and layers of MZ interferometer 200, MZ interferometer 250, and MZ interferometer 260 shown are provided as examples. In practice, there may be additional trenches and/or layers, fewer trenches and/or layers, different trenches and/or layers, differently arranged trenches and/or layers, differently sized trenches and/or layers, trenches and/or layers with different relative sizes, and/or the like, than those shown.

Some implementations described herein provide an improved MZ interferometer that includes a set of stress-balancing trenches 220 proximal to an optical waveguide of untrenched arm 210. In some implementations, the set of stress-balancing trenches 220 causes stress (e.g., compressive stress) at or near the optical waveguide of untrenched arm 210 to be substantially symmetric such that an orientation of a polarization axis, associated with untrenched arm 210, is preserved. In other words, the set of stress-balancing trenches 220 causes stress asymmetry at or near the optical waveguide of untrenched arm 210 to be reduced or eliminated such that polarization axis rotation in untrenched arm 210 is reduced or eliminated. Thus, the polarization axis can be substantially maintained without a significant increase in a required length of MZ interferometer 200 (e.g., as compared to prior art MZ interferometer 100).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
a waveguide-based MachZehnder (MZ) interferometer to perform polarization multiplexing or demultiplexing, the waveguide-based MZ interferometer including:
a first MZ arm,
wherein a portion of the first MZ arm is between at least two stress-reducing trenches of a plurality of stress-reducing trenches,
wherein the plurality of stress-reducing trenches is in a cladding layer on a substrate, and
wherein the at least two stress-reducing trenches reduce stress in the portion of the first MZ arm;
a second MZ arm adjacent to the first MZ arm,
wherein each of the at least two stress-reducing trenches is closer to the first MZ arm than to the second MZ arm; and
a set of stress-balancing trenches,
wherein the set of stress-balancing trenches is on an opposite side of the second MZ arm from the plurality of stress-reducing trenches, and
wherein the set of stress-balancing trenches is in the cladding layer on the substrate.

2. The optical device of claim 1, wherein the set of stress-balancing trenches causes stress on a portion of the second MZ arm to be substantially symmetric.

3. The optical device of claim 1, wherein the set of stress-balancing trenches causes a polarization axis, associated with the second MZ arm, to be substantially maintained.

4. The optical device of claim 1, wherein a number of trenches included in the set of stress-balancing trenches matches a number of trenches included in the plurality of stress-reducing trenches.

5. The optical device of claim 1, wherein a shape of each of the set of stress-balancing trenches matches a shape of each of the plurality of stress-reducing trenches.

6. The optical device of claim 1, wherein a length of each of the set of stress-balancing trenches matches a length of each of the plurality of stress-reducing trenches.

7. The optical device of claim 1, wherein a width of each of the set of stress-balancing trenches matches a width of each of the plurality of stress-reducing trenches.

8. The optical device of claim 1, wherein the set of stress-balancing trenches and the plurality of stress-reducing trenches are arranged symmetrically with respect to the second MZ arm.

9. The optical device of claim 1, wherein the set of stress-balancing trenches includes two stress-balancing trenches.

10. The optical device of claim 9, wherein a distance between the at least two stress-reducing trenches matches a distance between the two stress-balancing trenches.

11. The optical device of claim 1, wherein a distance between the second MZ arm and a stress-balancing trench, of the set of stress-balancing trenches, matches a distance between the second MZ arm and a stress-reducing trench of the plurality of stress-reducing trenches.

12. The optical device of claim 1, wherein a distance between a stress-balancing trench, of the set of stress-balancing trenches, and the second MZ arm is in a range from approximately 30 microns to approximately 250 microns.

13. An optical device, comprising:
a MachZehnder (MZ) interferometer including:
a first MZ arm,
wherein a portion of the first MZ arm is between a pair of trenches,
wherein the pair of trenches is in a cladding layer on a substrate;
a second MZ arm adjacent to the first MZ arm,
wherein a first trench, of the pair of trenches, is between the second MZ arm and the first MZ arm, and
wherein the first trench is closer to the first MZ arm than to the second MZ arm; and
a polarization axis maintenance structure that causes stress on a portion of the second MZ arm to be substantially symmetric such that an orientation of a polarization axis is substantially maintained in the second MZ arm,
wherein the polarization axis maintenance structure is in the cladding layer on the substrate.

14. The optical device of claim 13, wherein the polarization axis maintenance structure is on an opposite side of the second MZ arm from the pair of trenches.

15. The optical device of claim 13, wherein the polarization axis maintenance structure includes at least one stress-balancing trench.

16. The optical device of claim 13, wherein the polarization axis maintenance structure includes a pair of stress-balancing trenches,
wherein the pair of stress-balancing trenches and the pair of trenches are arranged symmetrically with respect to the second MZ arm.

17. A waveguide-based Mach-Zehnder (MZ) interferometer, comprising:
a first arm to guide light propagating in the first arm of the waveguide-based MZ interferometer;
at least two stress-reducing trenches to reduce stress on a portion of the first arm such that π phase birefringence is induced between two orthogonal polarization states of the light propagating in the waveguide-based MZ interferometer,
wherein the portion of the first arm is between a pair of the at least two stress-reducing trenches, and
wherein the at least two stress-reducing trenches are on or in a substrate of the waveguide-based MZ interferometer;
a second arm to guide light propagating in the second arm of the waveguide-based MZ interferometer,
wherein the second arm is adjacent to the first arm, and
wherein each of the at least two stress-reducing trenches is closer to the first arm than to the second arm; and
a set of stress-balancing trenches to maintain an orientation of a polarization axis in a portion of the second arm,
wherein the set of stress-balancing trenches is on an opposite side of the second arm from the at least two stress-reducing trenches, and
wherein the set of stress-balancing trenches is on or in the substrate of the waveguide-based MZ interferometer.

18. The waveguide-based MZ interferometer of claim 17, wherein the set of stress-balancing trenches causes stress on a portion of the second arm to be substantially symmetric.

19. The waveguide-based MZ interferometer of claim 17, wherein a number of trenches included in the set of stress-balancing trenches matches a number of trenches included in the at least two stress-reducing trenches.

20. The waveguide-based MZ interferometer of claim 17, wherein a number of stress-balancing trenches, included in the set of stress-balancing trenches, matches a number of stress-reducing trenches included in the at least two stress-reducing trenches.

\* \* \* \* \*

UNITED STATES PATENT AND TRADEMARK OFFICE
CERTIFICATE OF CORRECTION

PATENT NO. : 10,754,221 B2
APPLICATION NO. : 16/116277
DATED : August 25, 2020
INVENTOR(S) : Hiroaki Yamada Page 1 of 1

It is certified that error appears in the above-identified patent and that said Letters Patent is hereby corrected as shown below:

In the Claims

In Claim 1, Column 9, Line 7, "a waveguide-based MachZehnder (MZ) interferometer" should be changed to --a waveguide-based Mach-Zehnder (MZ) interferometer--;

In Claim 13, Column 10, Line 2, "a MachZehnder (MZ) interferometer including:" should be changed to --a Mach-Zehnder (MZ) interferometer including:--.

Signed and Sealed this
Twenty-seventh Day of October, 2020

Andrei Iancu
*Director of the United States Patent and Trademark Office*